US009964157B2

(12) United States Patent
Kallich

(10) Patent No.: US 9,964,157 B2
(45) Date of Patent: May 8, 2018

(54) CLUTCH ARRANGEMENT

(71) Applicant: Bayerische Motoren Werke Aktiengesellschaft, Munich (DE)

(72) Inventor: Stefan Kallich, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 102 days.

(21) Appl. No.: 14/865,470

(22) Filed: Sep. 25, 2015

(65) Prior Publication Data

US 2016/0010696 A1    Jan. 14, 2016

Related U.S. Application Data

(63) Continuation of application No. PCT/EP2014/052706, filed on Feb. 12, 2014.

(30) Foreign Application Priority Data

Mar. 28, 2013  (DE) .................. 10 2013 205 531

(51) Int. Cl.
    F16D 3/04      (2006.01)
    F16D 1/02      (2006.01)
    F16D 3/10      (2006.01)

(52) U.S. Cl.
    CPC .............. F16D 3/04 (2013.01); F16D 1/02 (2013.01); F16D 3/10 (2013.01); *Y10T 29/49874* (2015.01); *Y10T 403/7032* (2015.01)

(58) Field of Classification Search
    CPC . F16D 3/10; Y10T 403/7032; Y10T 29/49874
    (Continued)

(56) References Cited

U.S. PATENT DOCUMENTS 1,337,646 A *  4/1920  Eckart ................. F16D 3/12
                                                       464/60 X
4,332,148 A    6/1982  Maki et al.
(Continued)

FOREIGN PATENT DOCUMENTS

CN    101858390 A    10/2010
DE    42 17 744 A1   12/1992
(Continued)

OTHER PUBLICATIONS

Machinery's Handbock, 25th ed. New York, International Press, 1996, pp. 324-327. TJ151.M3 1996.*
(Continued)

*Primary Examiner* — Gregory J Binda
(74) *Attorney, Agent, or Firm* — Crowell & Moring LLP

(57) ABSTRACT

A clutch arrangement includes a first shaft, a second shaft arranged coaxially to the first shaft, and a clutch for connecting the first shaft to the second shaft without play. An axis of rotation is defined in accordance with the two shafts, a circumferential direction is defined around the axis of rotation, and a radial direction is defined perpendicularly to the axis of rotation. In addition, the clutch includes at least one displacement element and at least one clutch element which is displaceable relative to the two shafts in the circumferential direction and/or in the radial direction, and wherein the displacement element is designed to press the clutch element against the first and/or second shaft without play in the circumferential direction and/or in the radial direction in order to compensate for play between the two shafts in circumferential direction and for inevitable manufacturing tolerances of axial and angular offsets of the two shafts.

21 Claims, 13 Drawing Sheets

(58) Field of Classification Search
USPC .............. 464/60, 97; 403/359.4; 29/452
See application file for complete search history.

(56) References Cited

U.S. PATENT DOCUMENTS

| | | |
|---|---|---|
| 5,350,348 A | 9/1994 | Guot |
| 5,355,748 A | 10/1994 | Ito et al. |
| 5,984,223 A | 11/1999 | Hiramatsu |

FOREIGN PATENT DOCUMENTS

| | | | |
|---|---|---|---|
| DE | 698 22 136 T2 | | 7/2004 |
| DE | 10 2012 223 993 A1 | | 8/2013 |
| EP | 0 539 254 A1 | | 4/1993 |
| EP | 0 807 746 A1 | | 11/1997 |
| EP | 1 148 009 A1 | | 10/2001 |
| GB | 691281 | * | 5/1953 |
| WO | WO 2007/107138 A1 | | 9/2007 |

OTHER PUBLICATIONS

PCT/EP2014/052706, International Search Report dated Aug. 4, 2014 (Three (3) pages).

German Search Report issued in counterpart German Application No. DE 10 2013 205 531.5 dated Aug. 6, 2013, with Statement of Relevancy (Four (4) pages).

Chinese Office Action issued in Chinese counterpart application No. 201480004995.7 dated May 2, 2017, with English translation (Seventeen (17) pages).

Chinese Notification of the Third Office Action Issued in Chinese counterpart application No. 201480004995.7 dated Oct. 27, 2017 (Seven (7) pages).

* cited by examiner

CLUTCH ARRANGEMENT

CROSS REFERENCE TO RELATED APPLICATIONS

This application is a continuation of PCT International Application No. PCT/EP2014/052706, filed Feb. 12, 2014, which claims priority under 35 U.S.C. § 119 from German Patent Application No. 10 2013 205 531.5, filed Mar. 28, 2013, the entire disclosures of which are herein expressly incorporated by reference.

BACKGROUND AND SUMMARY OF THE INVENTION

The present invention relates to a coupling arrangement for the coaxial connection of two shafts. In particular, a crankshaft of an internal combustion engine is connected coaxially to an armature shaft of an electric machine. The invention also relates to a method for the mounting of the coupling arrangement.

Various arrangements for connecting an internal combustion engine to an electric machine and a motor vehicle are known from the prior art. In the prior art, use is normally made of belt drives for connecting the crankshaft to the armature shaft. In this case, the belt pulleys serve for compensation of torque fluctuations and for transmission of power without play. The use of the belt drive, and consequently also the non-coaxial arrangement of the electric machine with respect to the internal combustion engine, lead to a bulky construction. Furthermore, the belt drive requires maintenance.

It is an object of the present invention to specify a coupling arrangement for the coaxial connection of two shafts, which coupling arrangement, while being inexpensive with regard to production and mounting, requires little maintenance and operates quietly. It is also an object of the present invention to specify a corresponding method for the mounting of the coupling arrangement. The connection additionally has the task of compensating for coaxiality errors (angular and axial offsets) between the internal combustion engine and electric machine.

The object is achieved by means of the features of the independent claims. The dependent claims relate to advantageous refinements of the invention.

Thus, the object is achieved by means of a coupling arrangement comprising a first shaft, a second shaft and a coupling. The first shaft is in particular a crankshaft of an internal combustion engine in a motor vehicle. The second shaft is in particular an armature shaft of an electric machine. The electric machine is preferably operated as a high-voltage generator for generating electrical energy. Furthermore, the electric machine may also be used as an electric motor for starting the internal combustion engine. The case of the electric machine is preferably connected directly to the crankshaft case or the case of the internal combustion engine. The two shafts are arranged coaxially. This very compact and space-saving arrangement of the internal combustion engine and of the electric machine requires a special design of the coupling. To ensure quiet operation of the coupling with a low maintenance requirement, it is necessary to ensure transmission of power between the two shafts, in particular in both directions of rotation, without play. The coupling therefore comprises at least one motion element and one coupling element. The coupling element is arranged so as to be movable in a circumferential direction and/or in a radial direction. The motion element ensures that the coupling element abuts, or is pressed, against the respective shaft without play in a circumferential direction or a radial direction. Owing to the play-free abutment of the coupling element against the respective shaft, a torque can be transmitted between the two shafts without play.

It is provided in particular that the motion element is a spring and/or a hydraulic pressure chamber. The spring and/or the hydraulic pressure chamber is arranged in the coupling and presses the coupling element against the first or second shaft, so as to permit the play-free abutment and thus also the play-free transmission of power. Axial movements are also possible.

According to the invention, with regard to the exact design of the coupling arrangement, three variants are provided:

In the first variant, the coupling comprises a first toothed shaft, a second toothed shaft and a third toothed shaft. The three toothed shafts form coupling elements. The first toothed shaft is spaced apart from the second toothed shaft. The third toothed shaft is situated between the first toothed shaft and the second toothed shaft. The three toothed shafts are arranged coaxially along the axis of rotation. The first toothed shaft is connected to the second toothed shaft by way of a torsion spring. Accordingly, the first toothed shaft and the second toothed shaft are each connected rotationally conjointly, for example by way of a polygonal formation, to the torsion spring. In this variant, the torsion spring forms the motion element. The torsion spring causes the first toothed shaft to abut without play against the first shaft and the second toothed shaft to abut without play against the second shaft; this is achieved by virtue of the power flow between the two shafts being established via the third toothed shaft.

In particular, it is provided that the first shaft comprises a first shaft toothing and the second shaft comprises a second shaft toothing. The two shaft toothings are, in particular, internal toothings on the crankshaft and on the armature shaft. In the mounted state of the coupling arrangement, the first shaft toothing meshes both with the first toothed shaft and with the third toothed shaft, and the second shaft toothing meshes with the second toothed shaft and simultaneously with the third toothed shaft.

For the compensation of manufacturing-induced errors with regard to axial offset and angle, the toothing is of flank-centered configuration and is of crowned form at both ends of the toothed shaft.

The third toothed shaft is preferably of internally hollow form. In this way, it is possible for the torsion spring to extend through the third toothed shaft. The first toothed shaft and the second toothed shaft are seated on the two ends of the torsion spring. The third toothed shaft is preferably arranged so as to be rotatable relative to the torsion spring.

The first toothed shaft and the second toothed shaft are preferably rotated relative to one another, such that the torsion spring is braced. The first shaft, in particular the first shaft toothing, abuts either against the first toothed shaft or against the third toothed shaft depending on direction of rotation. Likewise, the second shaft toothing may abut either against the second toothed shaft or against the third toothed shaft. The different directions of rotation arise in accordance with whether the electric machine is operated as a generator or as a motor. By virtue of the fact that in each case the tooth flanks of the first toothed shaft and of the third toothed shaft, and of the second toothed shaft and of the third toothed shaft, respectively, are available to the shaft toothings, play-free transmission of power between the crankshaft and the armature shaft is possible.

In the second variant, the coupling is designed as an Oldham coupling. For this purpose, the coupling comprises a main body. The main body comprises a projection on each side. The first projection engages into a groove of the first shaft. The second projection engages into a groove of the second shaft. The projections which engage into the grooves permit, to a limited extent, compensation of a radial and axial offset between the two shafts.

In the second variant, the motion element is preferably a spring and/or a hydraulic pressure chamber. The coupling element is in the form of at least one piston. The piston is guided in a linearly movable manner in the main body. The spring and/or the hydraulic pressure chamber cause(s) the piston to be forced away from the main body. As a result, the piston abuts in the groove of the respective shaft and ensures a play-free transmission of power.

It is provided in particular that at least one piston is provided on that side of the main body which faces toward the first shaft, that is to say on the first projection, and that at least one piston is likewise arranged on the side facing toward the second shaft, that is to say on the second projection.

In a particularly preferred embodiment, in each case multiple pistons are arranged in both projections of the main body. Each piston is subjected to load at least by a spring, and may furthermore be pushed outward by way of a dedicated hydraulic pressure chamber.

Corresponding hydraulic ducts in the main body serve for a supply of pressure to the hydraulic pressure chambers. In particular, the hydraulic pressure from the lubricant supply of the internal combustion engine is used for this purpose.

A preferred check valve in the hydraulic ducts ensures the pressure in the hydraulic pressure chambers below the individual pistons is adequately maintained. It is preferable for small outlet openings to be provided in the pistons. Via said small outlet openings, hydraulic oil emerges from the hydraulic pressure chambers onto the surface of the pistons. This leads to a throttled dissipation of the pressure in the hydraulic pressure chambers, and simultaneously to lubrication of the sliding surfaces between the coupling and the two shafts.

The force of the springs and/or the force of the hydraulic pressure chambers do not need to be of such a magnitude as to constantly force the pistons away from the main body. It is adequate for the pistons to abut against the two shafts at least during a change in the direction of rotation. With increasing torque, the pistons are then pushed into the main body. In this case, the hydraulic oil is conveyed out of the hydraulic pressure chambers to the outside preferably via the outlet openings.

In the third variant, the coupling is in the form of a claw coupling. In this case, the coupling comprises a first ring which is arranged rotationally conjointly on the first shaft, a second ring which is arranged rotationally conjointly on the second shaft, and a compensation ring which is arranged between the two shafts. In this case, the compensation ring constitutes the movable coupling element. The first ring comprises first claws. The second ring comprises second claws. The compensation ring comprises compensation claws. The compensation ring is movable to a limited extent relative to the two shafts. The first claws, the second claws and the compensation claws engage with one another. Limited compensation of a radial and axial offset is thus possible depending on the size of the claws. Viewing the arrangement in a circumferential direction, in each case one compensation claw is situated between a first claw and a second claw. A spring in the form of a helical compression spring or a plate spring is arranged at least between one second claw and one compensation claw. The spring is supported with one end against a second claw and with the other end against a compensation claw. The compensation claw in turn presses against a first claw, whereby said first claw is pressed against a following second claw. The spring thus serves for pressing the second claws against the first claws in the direction of the output effective torque.

In particular, pockets are provided in the compensation claws, such that the springs can be arranged partially in said pockets. In the event of a change in direction of the torque, the springs are compressed to such an extent as to be seated entirely in the pockets. The compensation claws thus abut against the second claws.

For the mounting of the second ring on the second shaft, a conical clamping element is preferably used.

The first shaft is preferably of conical form. An internal cone corresponding thereto is preferably formed on the first ring. A clamping screw and a clamping disk are preferably used in addition to said conical connection. The clamping screw is preferably screwed into the face side of the first shaft, in order thereby to hold the first ring on the first shaft.

The invention preferably encompasses a control unit for the control and/or regulation of the electric machine, wherein the control unit is designed to actuate the electric machine in such a way as to compensate for rotational irregularities. For example, rotational irregularities arise at the crankshaft in a manner dependent on the number of cylinders in the internal combustion engine. These rotational irregularities can be compensated for through corresponding actuation of the electric machine.

The invention furthermore encompasses a method for mounting a coupling arrangement as per the first variant described above. Said method comprises the following steps: (i) bracing the torsion spring by rotating the first toothed shaft relative to the second toothed shaft, (ii) inserting a first rotation prevention means, which fixes the first toothed shaft relative to the third toothed shaft, and a second rotation prevention means, which fixes the second toothed shaft relative to the third toothed shaft, (iii) mounting the first toothed shaft on the first shaft and mounting the second toothed shaft on the second shaft, and (iv) releasing the two rotation prevention means.

In particular, it is preferably provided that the release of the two rotation prevention means takes place at the same time as the first and second toothed shafts are mounted on the first and second shafts. In this case, the rotation prevention means is displaced as a result of the respective toothed shaft being pushed into the internal toothing on the crankshaft or armature shaft. This causes the rotation prevention means to be released.

There are two preferred options for the rotation prevention means: firstly, the rotation prevention means may be in the form of a sleeve. Secondly, the rotation prevention means may be in the form of pins.

The sleeve is pushed on after the bracing of the torsion spring, such that an internal toothing on the sleeve meshes simultaneously with the first toothed shaft and the third toothed shaft, and with the second toothed shaft and the third toothed shaft, respectively. The sleeves are preferably pushed inward when the coupling is mounted on the two shafts. After the mounting process, the sleeves are preferably seated fully on the third toothed shaft. After the mounting process, the sleeves perform no further function but preferably remain on the third toothed shaft.

As an alternative to the sleeves, use may be made of the pins. The pins engage into the face sides of the toothed shafts. After the bracing of the torsion spring, the pins are positioned so as to fix the first toothed shaft relative to the third toothed shaft, and the second toothed shaft relative to the third toothed shaft, respectively such that relaxation of the torsion spring is no longer possible. During the mounting of the coupling arrangement, the pins are displaced, in particular inwardly into the third toothed shaft.

It is also possible for a sleeve to be used as rotation prevention means at one side of the coupling, and for the pins to be used as rotation prevention means at the other side.

For the bracing of the torsion spring, the following method sequence in particular is provided: by rotating the first and/or second toothed shaft, the torsion spring is braced until a desired spring force is measured. It is advantageous to utilize the material plasticization (similarly to expanding screws) for the exact setting of the spring force. The spring force thus remains virtually constant over a wide "tightening angle" and is determined primarily by the spring diameter. The first toothed shaft and/or second toothed shaft are/is thereupon rotated further or backward until the toothings of the three toothed shafts coincide such that the sleeve can be pushed on. If the pins are used, forward or backward rotation is performed until the holes of the pins are aligned, and thus the pins can be inserted.

Further details, features and advantages of the invention will emerge from the following description and from the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
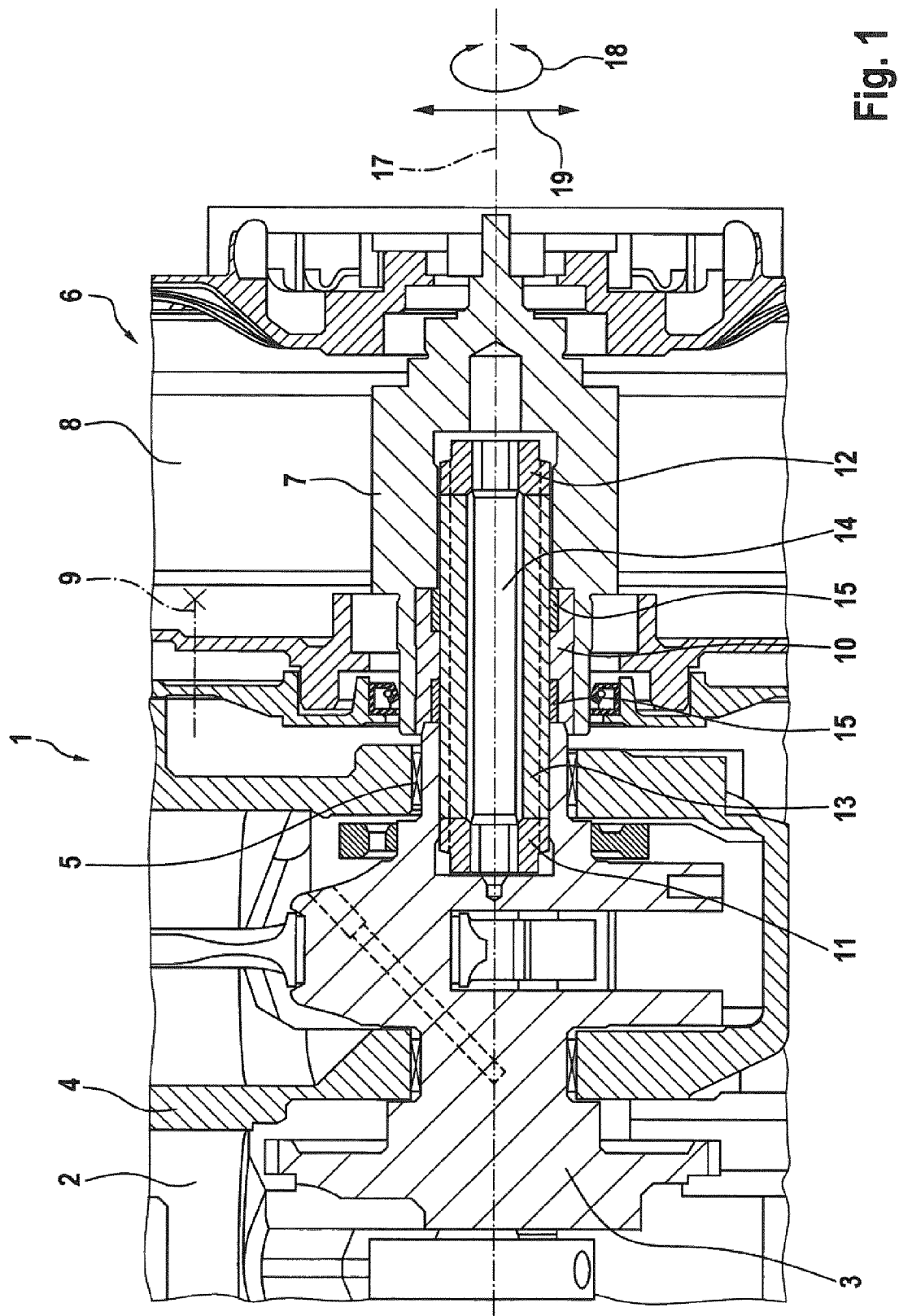
FIG. 1 shows a coupling arrangement according to the invention as per a first exemplary embodiment.

In FIGS. 1 to 13, identical or functionally identical components are denoted by the same reference numerals.

In FIG. 1, the coupling arrangement comprises a first shaft 3, in the form of a crankshaft of an internal combustion engine 2 in a motor vehicle. The first shaft 3 is arranged in an engine case 4. The first shaft 3 is mounted in the engine case 4 by way of at least one bearing 5.

Furthermore, the coupling arrangement 1 comprises a second shaft 7, in the form of an armature shaft of an electric machine 6. The electric machine 6 is operated primarily as a high-voltage generator. The electric machine 6 may furthermore also be operated as a motor for the purpose of starting the internal combustion engine 2. The electric machine 6 comprises a generator case 8. The second shaft 7 is mounted in said generator case 8.

The generator case 8 is fixedly connected to the motor case 4 by way of a screw connection 9, which is merely schematically illustrated. The two shafts 3, 7 are arranged coaxially. Here, the arrangement is of extremely space-saving design. A coupling 10 is provided for the coaxial connection of the two shafts 3, 7. The coupling 10 projects into an internal toothing on the first shaft 3 and into an internal toothing on the second shaft 7. The generator case 8 is thus positioned closely adjacent to the engine case 4, such that the coupling 10 projects in the axial direction as far as the bearing 5.

An axis of rotation 17 is defined in accordance with the rotation of the two shafts 3, 7 and of the coupling 10. A circumferential direction 18 is defined about the axis of rotation 17. A radial direction 19 stands perpendicular to the axis of rotation 17.

Figure 2:
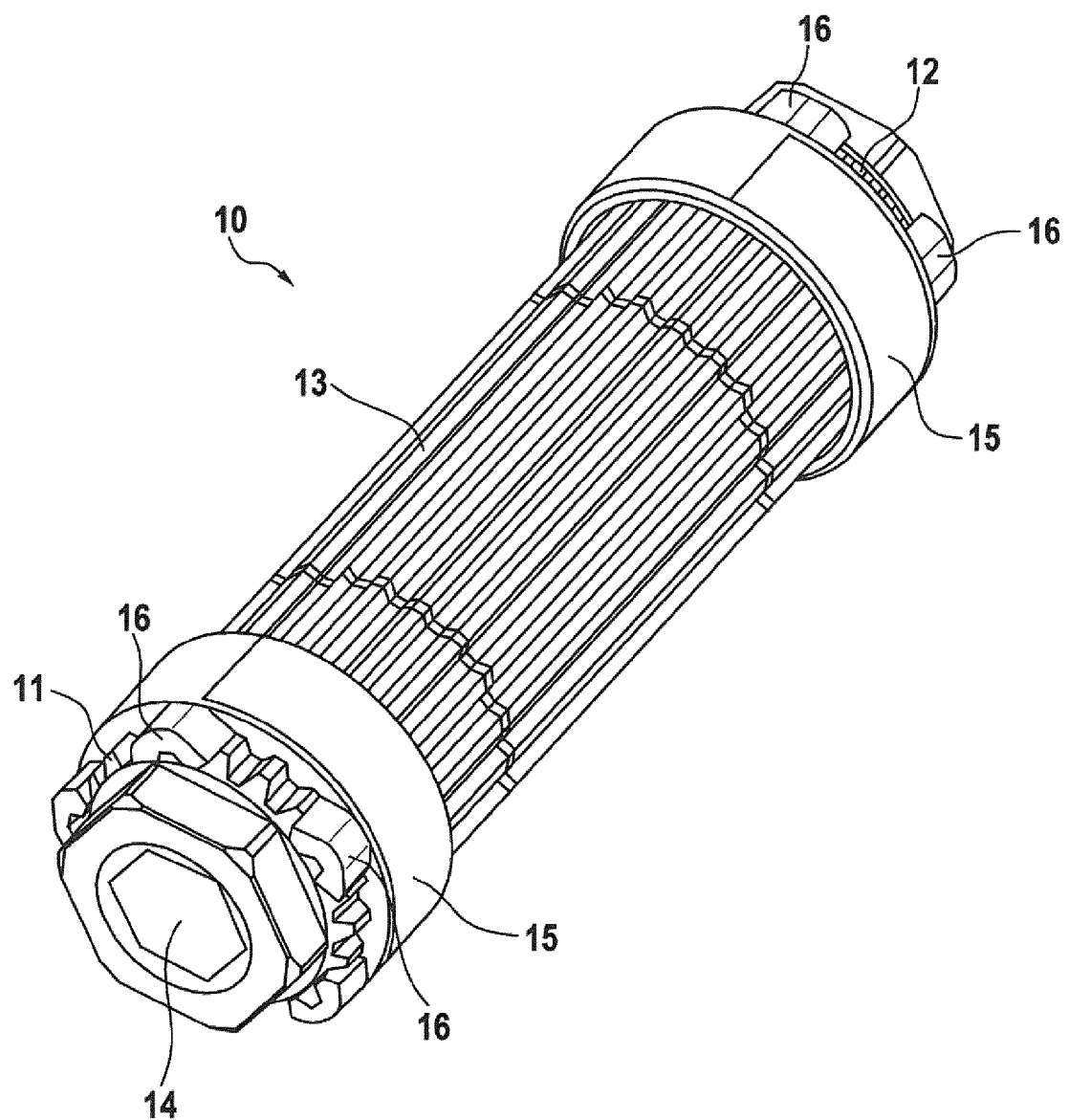
FIGS. 2 and 3 show a coupling of the coupling arrangement according to the invention as per the first exemplary embodiment.
Figure 3:
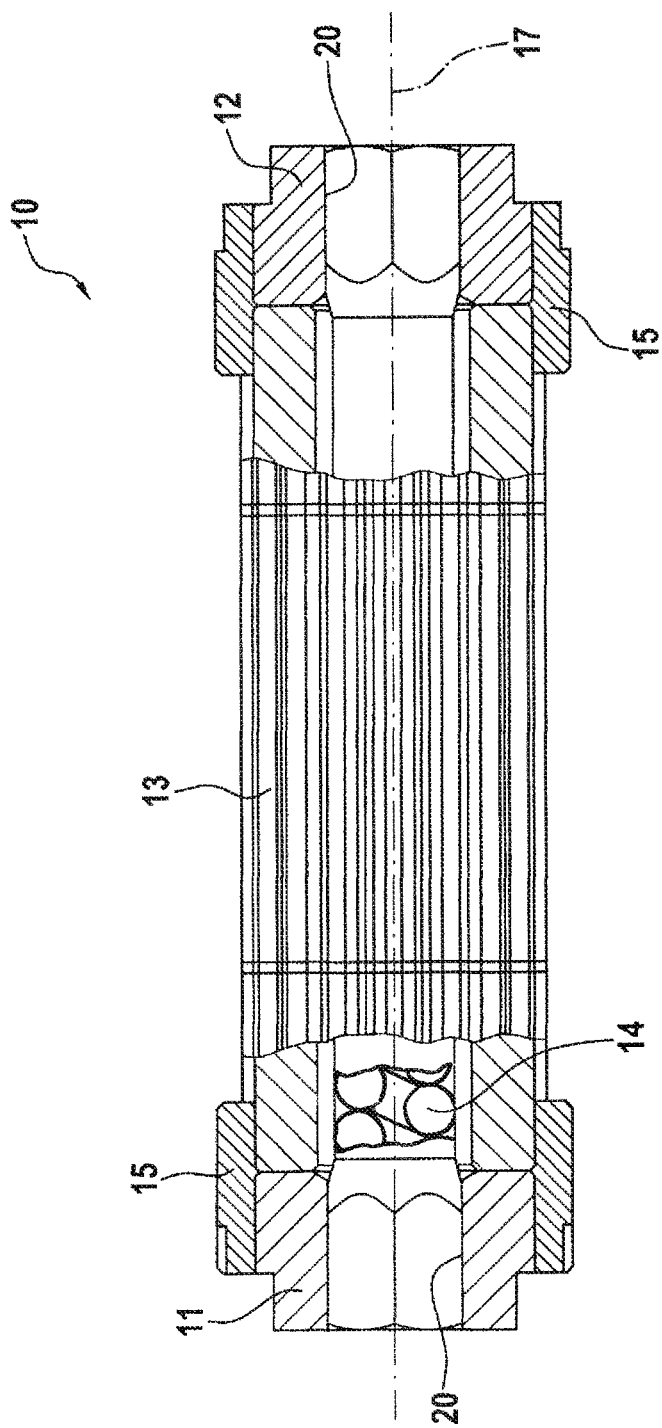

The exact construction of the coupling 10 is shown in FIGS. 2 and 3. Here, FIG. 3 shows a sectional view. The coupling 10 comprises a first toothed shaft 11, a second toothed shaft 12, a third toothed shaft 13 and a torsion spring 14. The third toothed shaft 13 is arranged along the axis of rotation 17 between the first toothed shaft 11 and the second toothed shaft 12. The torsion spring 14 is, at its ends, connected rotationally conjointly by way of a polygonal formation 20 to the first toothed shaft 11 and to the second toothed shaft 12. The third toothed shaft 13 is internally hollow, such that the torsion spring 14 can extend through the third toothed shaft 13.

FIGS. 2 and 3 show the coupling 10 in a state before it is mounted into the two shafts 3, 7. In FIGS. 2 and 3, rotation prevention means 15 in the form of sleeves are engaged onto the coupling 10 at both sides. Before the mounting of the coupling 10, the first toothed shaft 11 and the second toothed shaft 12 are rotated relative to one another such that the torsion spring 14 is braced. To maintain this braced state, the rotation prevention means 15 is pushed on at both sides. Here, the rotation prevention means 15 mesh with the toothings of the toothed shafts 11, 12, 13. During the mounting of the coupling 10, the rotation prevention means 15 are displaced inward onto the third toothed shaft 13. As a result, the first toothed shaft 11 and the second toothed shaft 12 are no longer fixed relative to the third toothed shaft 13, and the torsion spring 14 can act, whereby the driving flank of the internal toothing of the crankshaft is pressed with the spring force against the driven flank of toothed shaft 13, and the driving flank of the toothed shaft 13 is pressed with the spring force against the flank, which is to be driven, of the internal toothing of the armature shaft.

After the mounting process, the two rotation prevention means 15 can remain, without function, on the third toothed shaft 13. In FIG. 2, multiple lugs 16 are formed on the two rotation prevention means 15. On the first shaft 3 and/or on the second shaft 7, it is necessary for devices to be provided which engage on said lugs 16 in order, during the mounting process, to displace the rotation prevention means 15 inward and transfer the holding force for the preload from the sleeves to the internal toothing.

Figure 4:
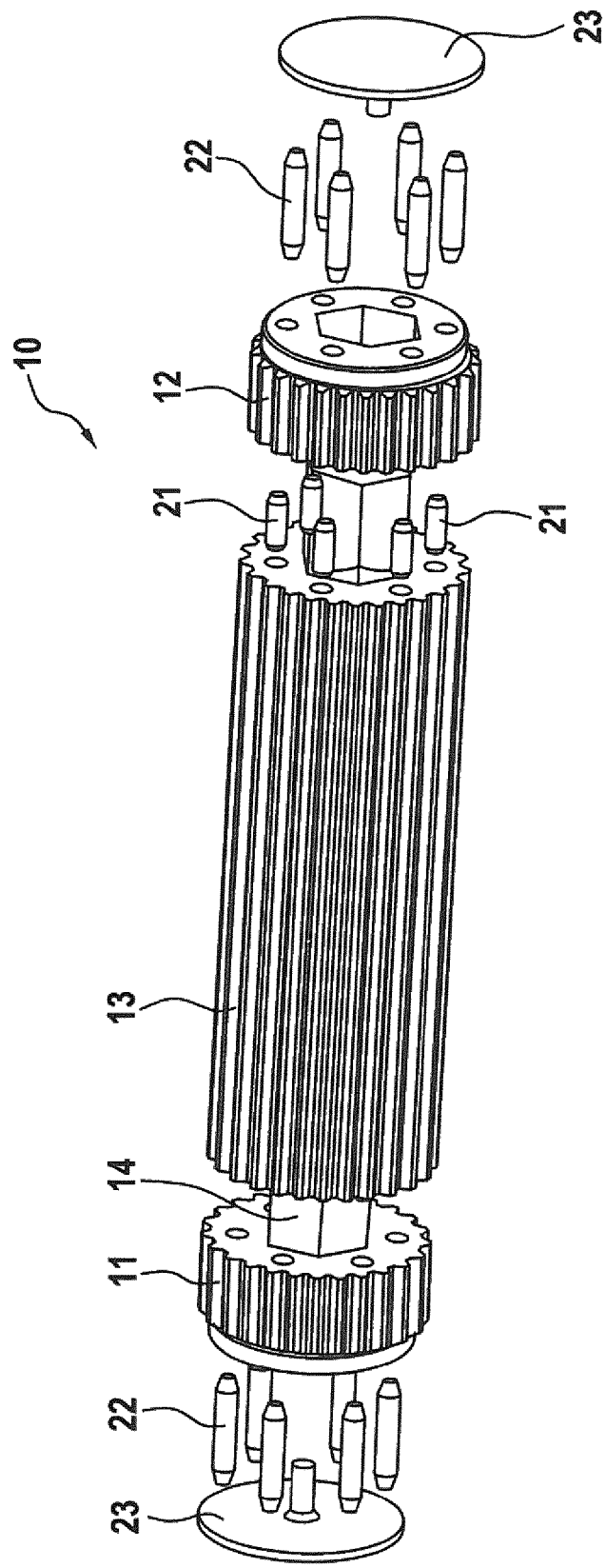
FIGS. 4 to 6 show a coupling of the coupling arrangement according to the invention as per a second exemplary embodiment.
Figure 5:
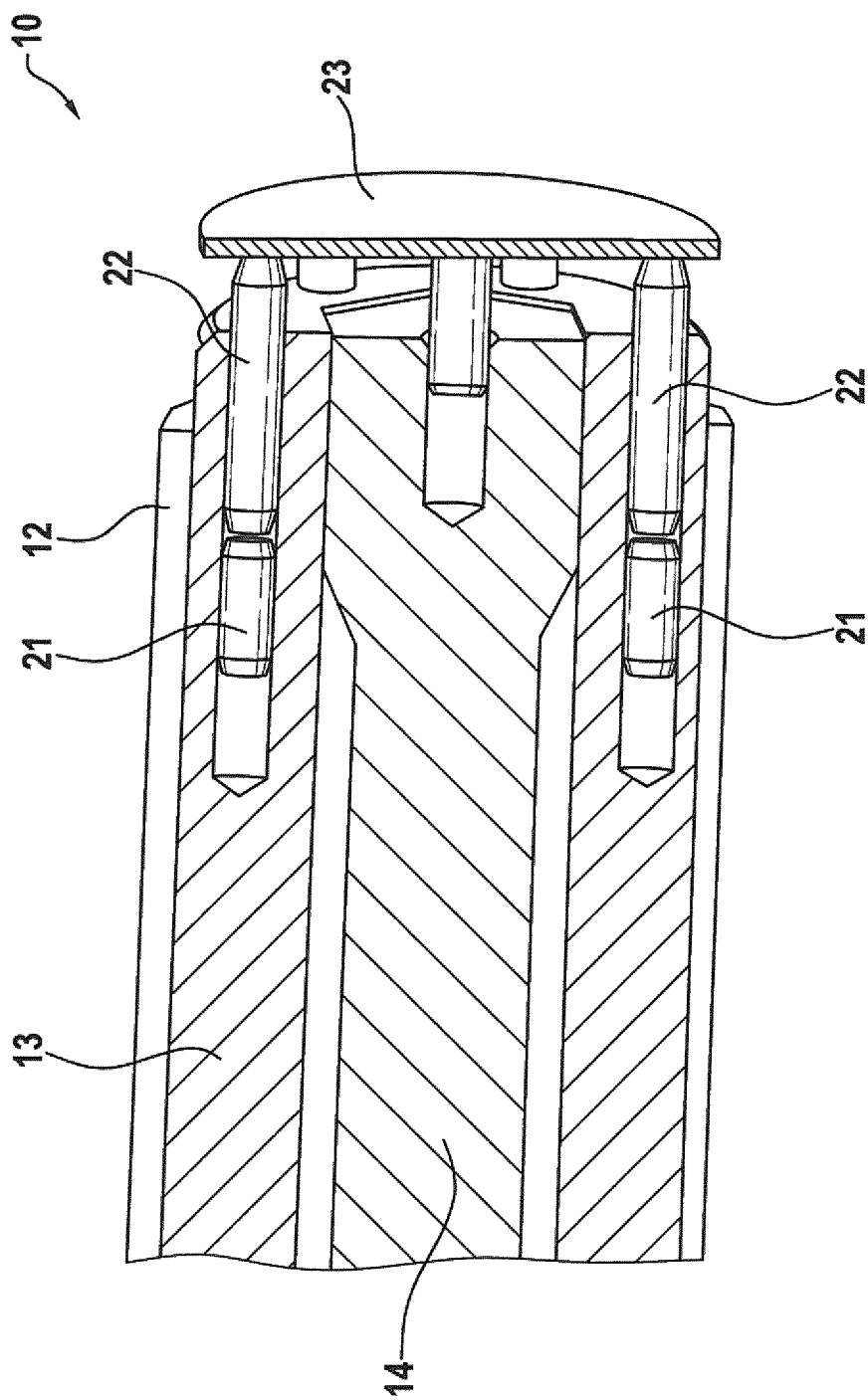
Figure 6:
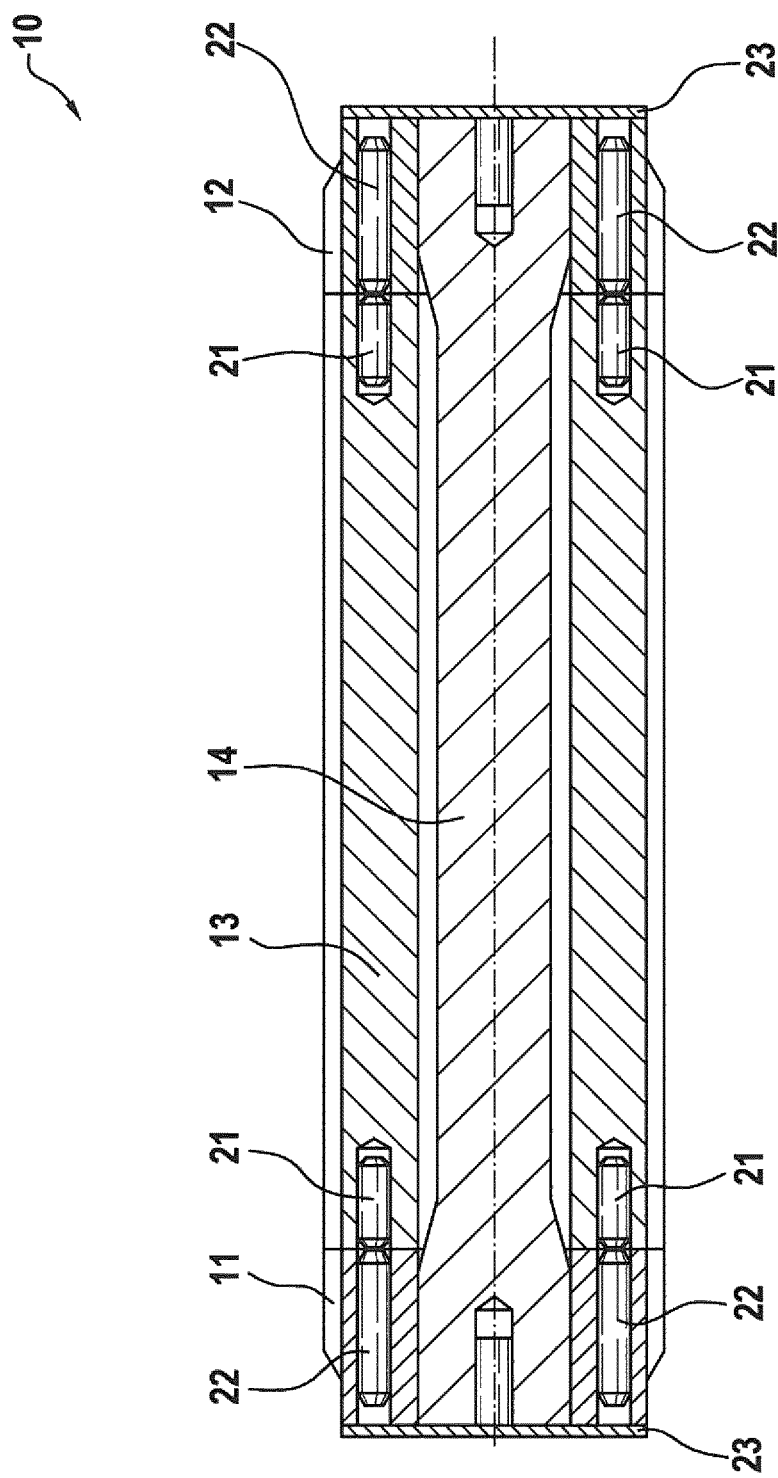

FIGS. 4 to 6 show a further exemplary embodiment in which the coupling 10 comprises the three toothed shafts 11, 12, 13 and the torsion spring 14. FIG. 4 shows an exploded illustration of the coupling 10. FIGS. 5 and 6 show sectional views of the coupling 10 in different mounting states.

In the second exemplary embodiment, the rotation prevention means are in the form of pins 21. After the rotation of the first toothed shaft 11 and of the second toothed shaft 12 for the purposes of bracing the torsion spring 14, pins 21 are pushed in order to hold the torsion spring 14 in the braced state. This state is illustrated in FIG. 5.

During the mounting of the coupling 10 into the two shafts 3, 7, mounting pins 22 are pushed in at the face sides. Said mounting pins 22 push the pins 21 further inward, into the third toothed shaft 13. This causes the rotation prevention means to be released, and the torsion spring 14 can act.

For pushing in the mounting pins 22, face-side mounting plates 23 are shown at both sides. Said mounting plates 23 may also be constituent parts of the shafts 3, 7, such that the pins 21 are released at the same time as the coupling 10 is mounted.

FIGS. 7 to 11 show exemplary embodiments in which the coupling 10 is in the form of an Oldham coupling.

Figure 7:
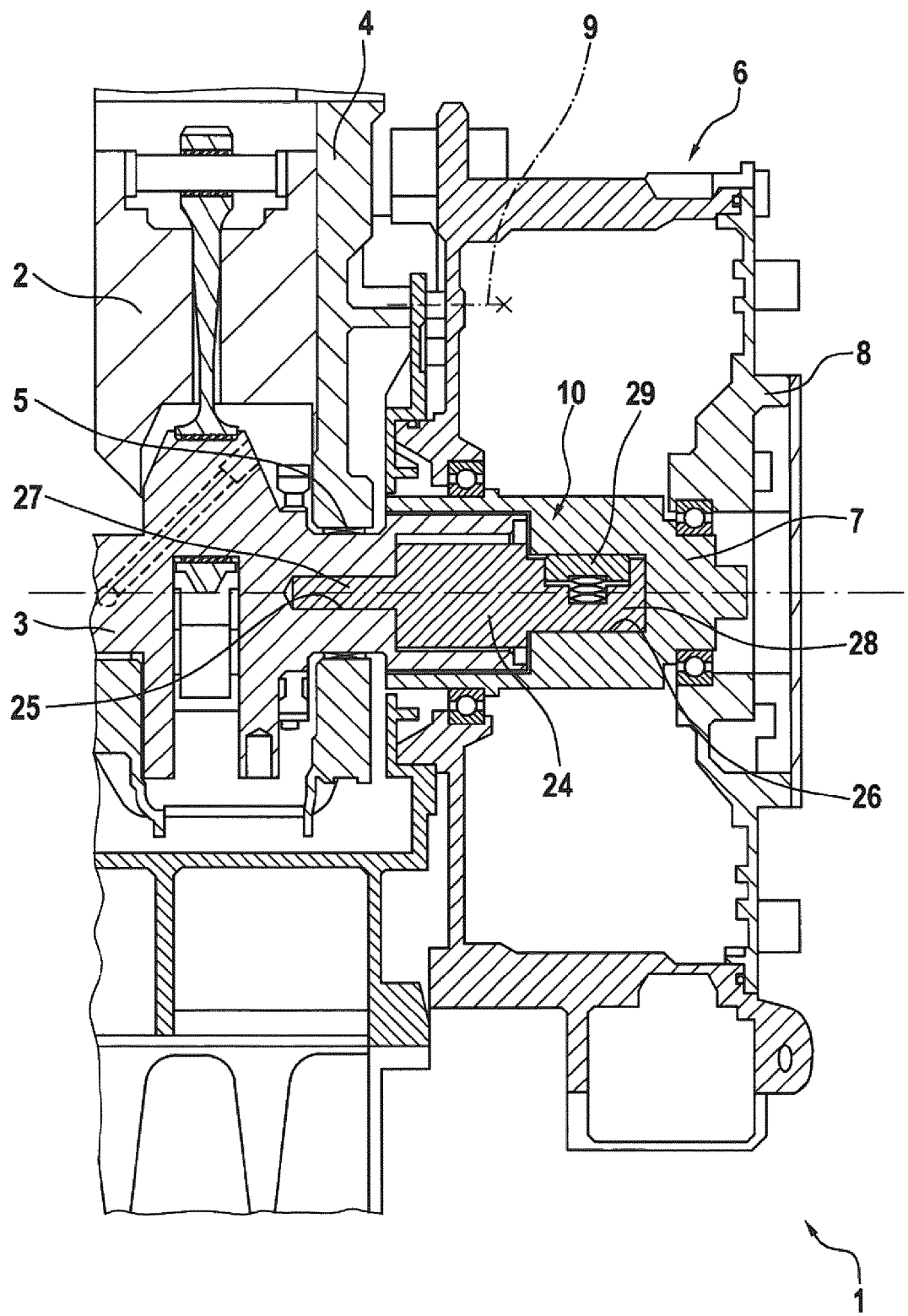
FIG. 7 shows the coupling arrangement according to the invention as per a third exemplary embodiment.

FIG. 7 shows the coupling arrangement 1 with the coupling 10. The coupling 10 comprises a main body 24. The main body 24 has in each case one projection 27, 28 at its two axial ends. The first projection 27 engages in a first groove 25 in the first shaft 3. The second projection 28 engages in a second groove 26 in the second shaft 7.

Figure 8:
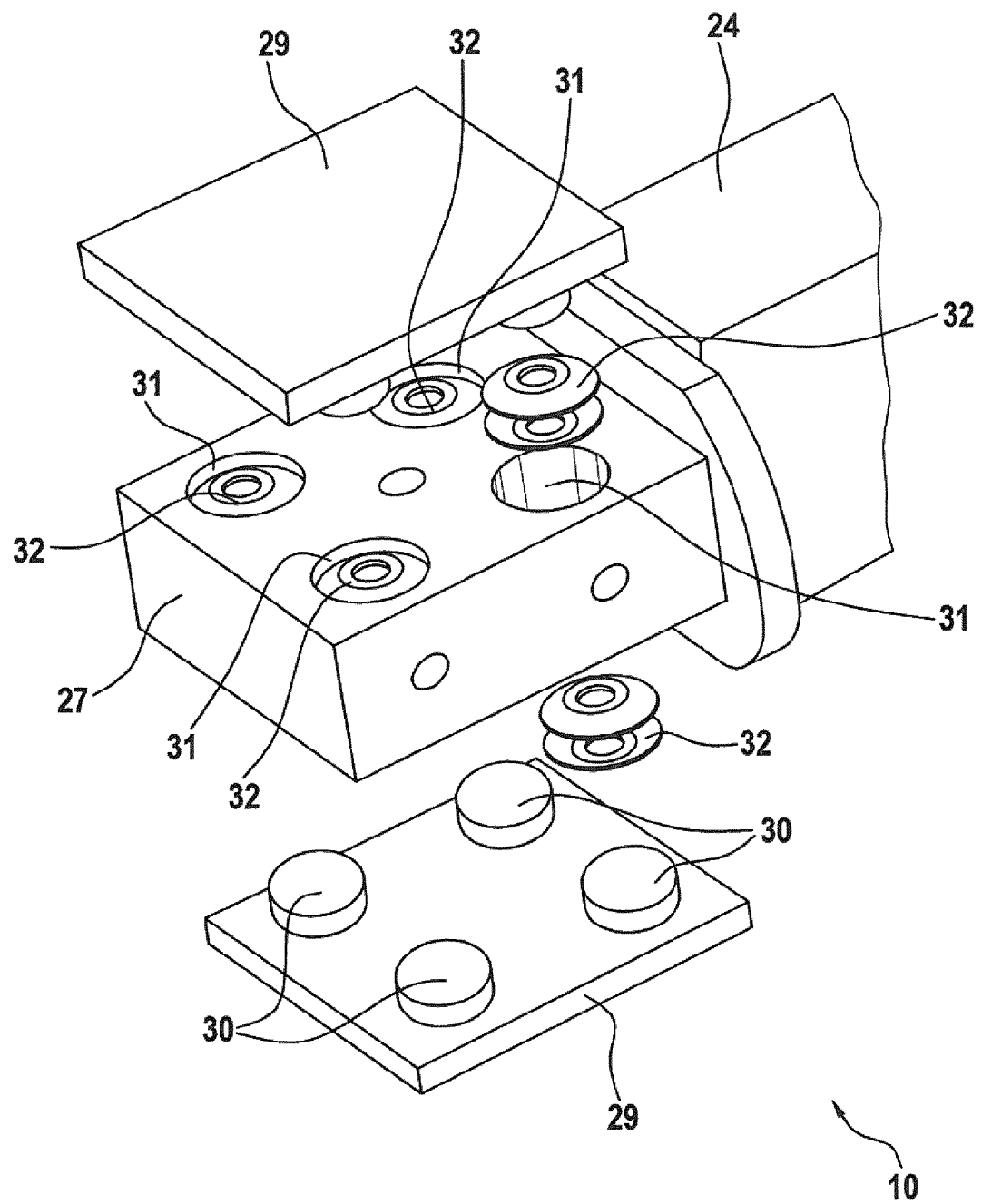
FIGS. 8 and 9 show the coupling of the coupling arrangement according to the invention as per the third exemplary embodiment.

FIG. 8 shows the first projection 27 of the main body 24 in detail. The second projection 28 is of identical construction but rotated through 90° about the axis of rotation 17.

On the first projection 27 there are two opposite surfaces which, depending on the direction of rotation, abut against the first groove 24 in order to transmit torque. A piston 29 is provided on each of the two surfaces. The piston 29 constitutes a planar surface for play-free abutment.

On the inner side of the piston 29 there are provided in each case four studs 30. The studs 30 each engage in a hydraulic pressure chamber 31. In each of the hydraulic pressure chambers 31 there is situated a spring 32 in the form of a plate spring. The springs 32 and the corresponding pressure in the hydraulic pressure chambers 31 force the pistons 29 away from the first projection 27.

Figure 9:
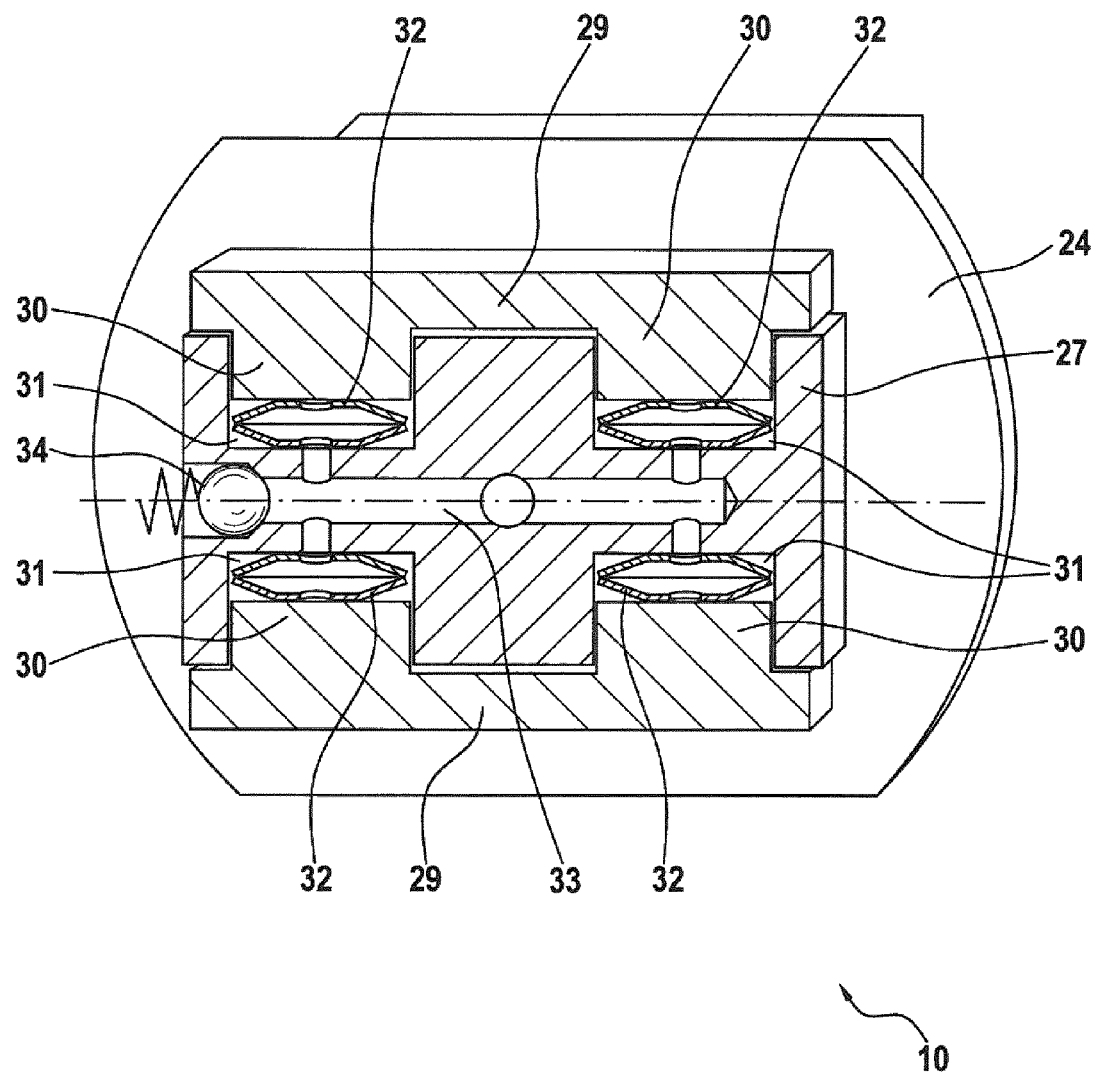

FIG. 9 shows, in a sectional view, hydraulic ducts 33 for the supply of pressure to the hydraulic chambers 31. A check valve 34 ensures that a pressure in the hydraulic pressure chambers 31 is adequately maintained. It is preferably the case that hydraulic oil is delivered out of the internal combustion engine 2 into the hydraulic ducts 33, and thus into the hydraulic pressure chambers 31, via the check valve 34.

Figure 10:
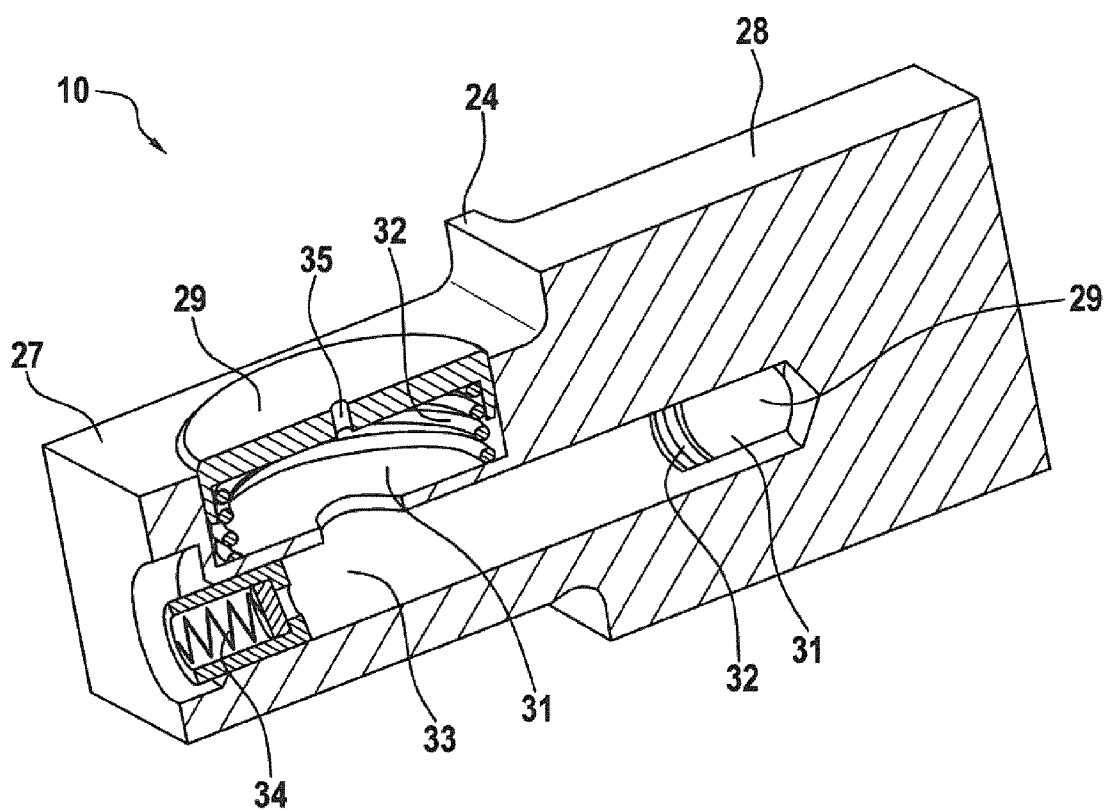
FIG. 10 shows the coupling of the coupling arrangement according to the invention as per a fourth exemplary embodiment.

FIG. 10 shows the design of the main body 24 in accordance with a further exemplary embodiment. In this exemplary embodiment, in each case one large piston 29 is provided on each projection 27, 28. Said large pistons 29 are also subjected to load by springs 32 and situated in hydraulic pressure chambers 31. FIG. 10 shows that a piston 29 is provided in each case only on one side of each projection 27, 28. It would however alternatively be possible for in each case two opposite pistons 29 to be used on each projection 27, 28.

FIG. 10 also shows that outlet openings 35 are provided in the pistons 29. Oil from the hydraulic pressure chambers 31 can pass to the outside through said outlet openings 35. The outlet openings 35 each constitute throttles for regulating the pressure in the hydraulic pressure chambers 31. At the same time, the oil that emerges serves for lubricating the surfaces between the coupling 10 and the two shafts 3, 7.

Figure 11:
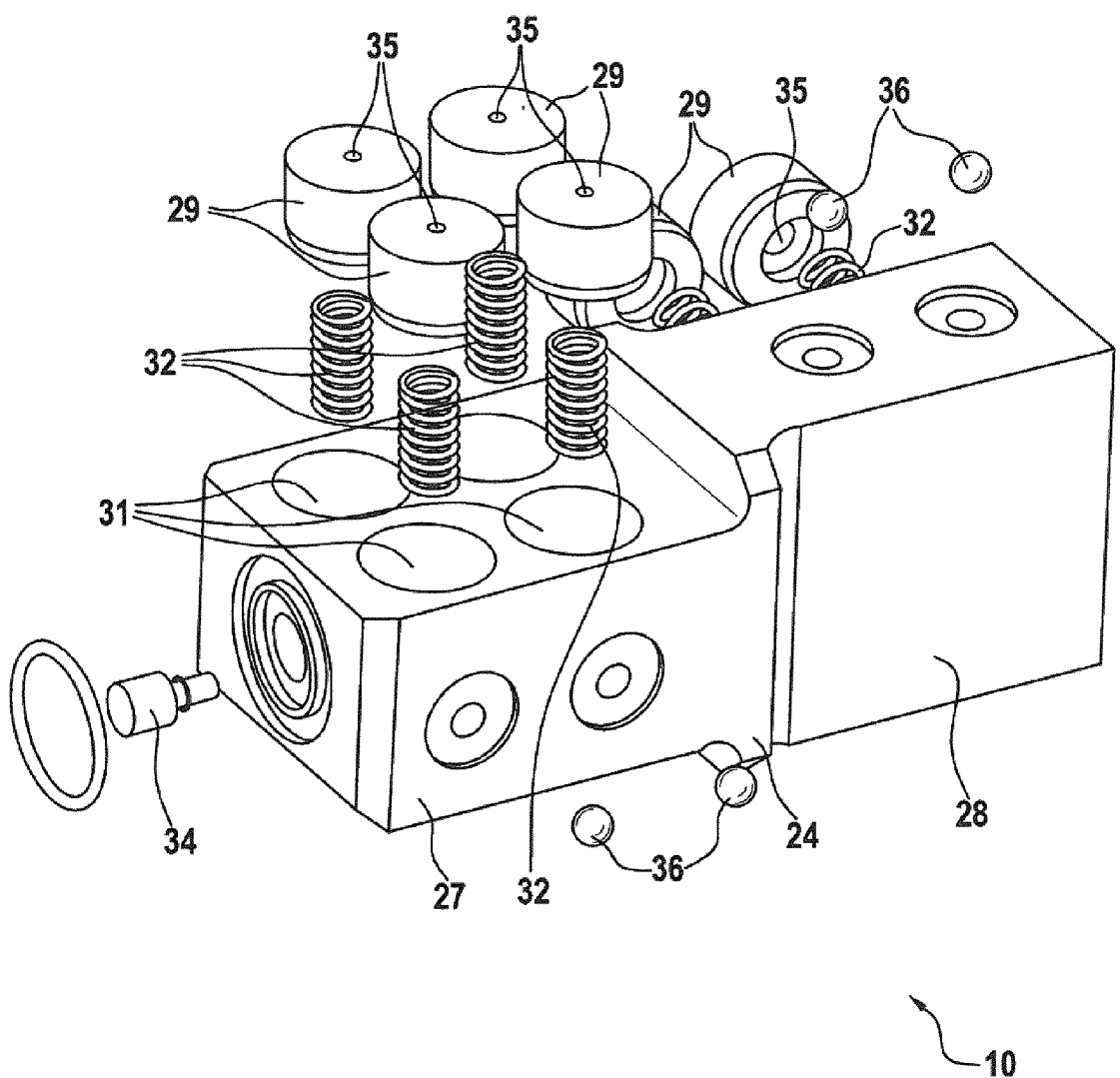
FIG. 11 shows the coupling of the coupling arrangement according to the invention as per a fifth exemplary embodiment.

FIG. 11 shows a further exemplary embodiment of the Oldham coupling. In FIG. 11, there are multiple small pistons 29 arranged adjacent to one another in both projections 27, 28. Each piston 29 is seated in a dedicated hydraulic pressure chamber 31 and is subjected to load by a dedicated spring 32 in the form of a helical spring. In the exemplary embodiment shown, four pistons 29 are used in each projection 27, 28.

Superfluous openings formed during the drilling of the hydraulic ducts 33 are closed off by way of closure balls 36.

Figure 12:
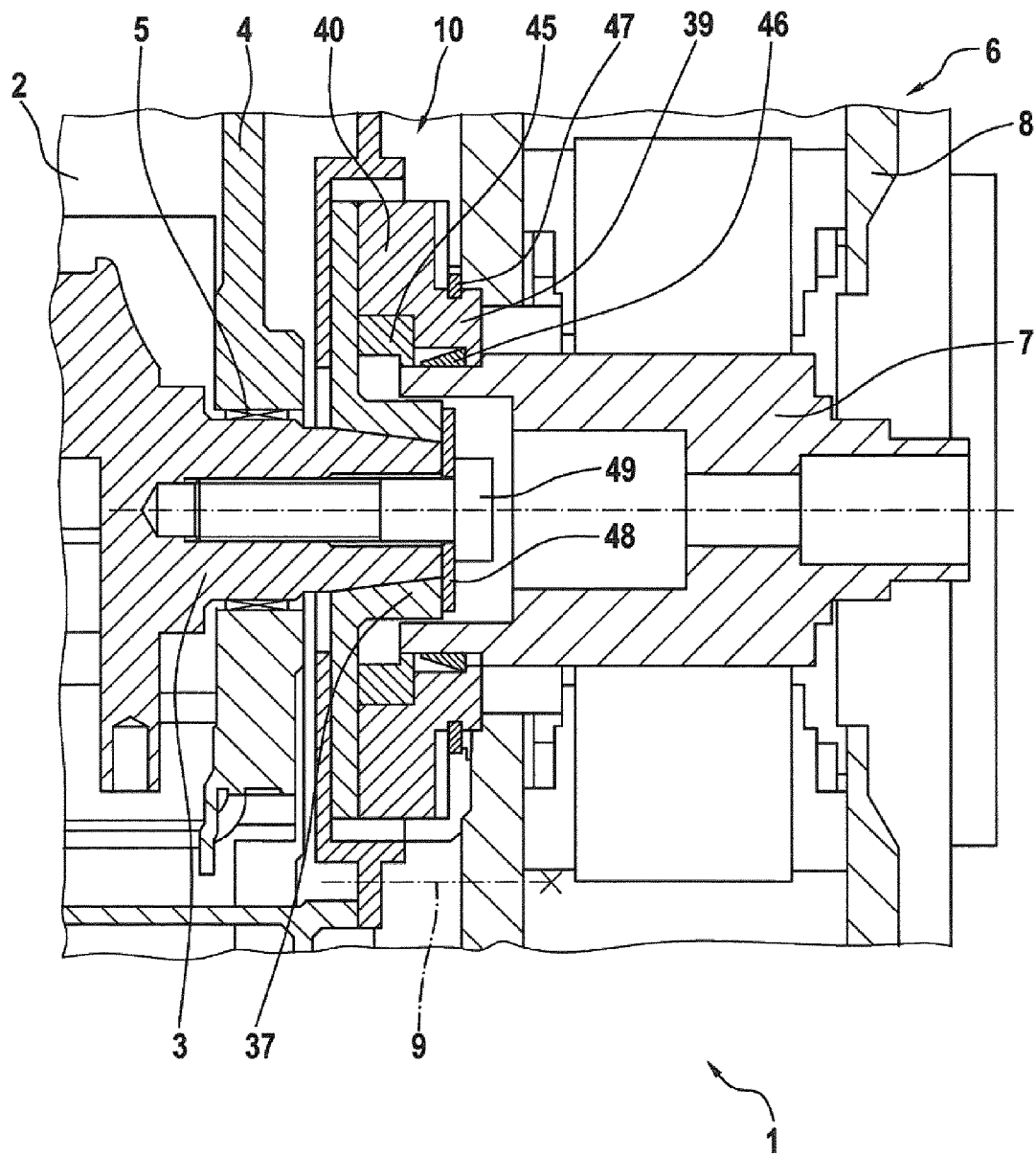
FIG. 12 shows the coupling arrangement according to the invention as per a sixth exemplary embodiment.
Figure 13:
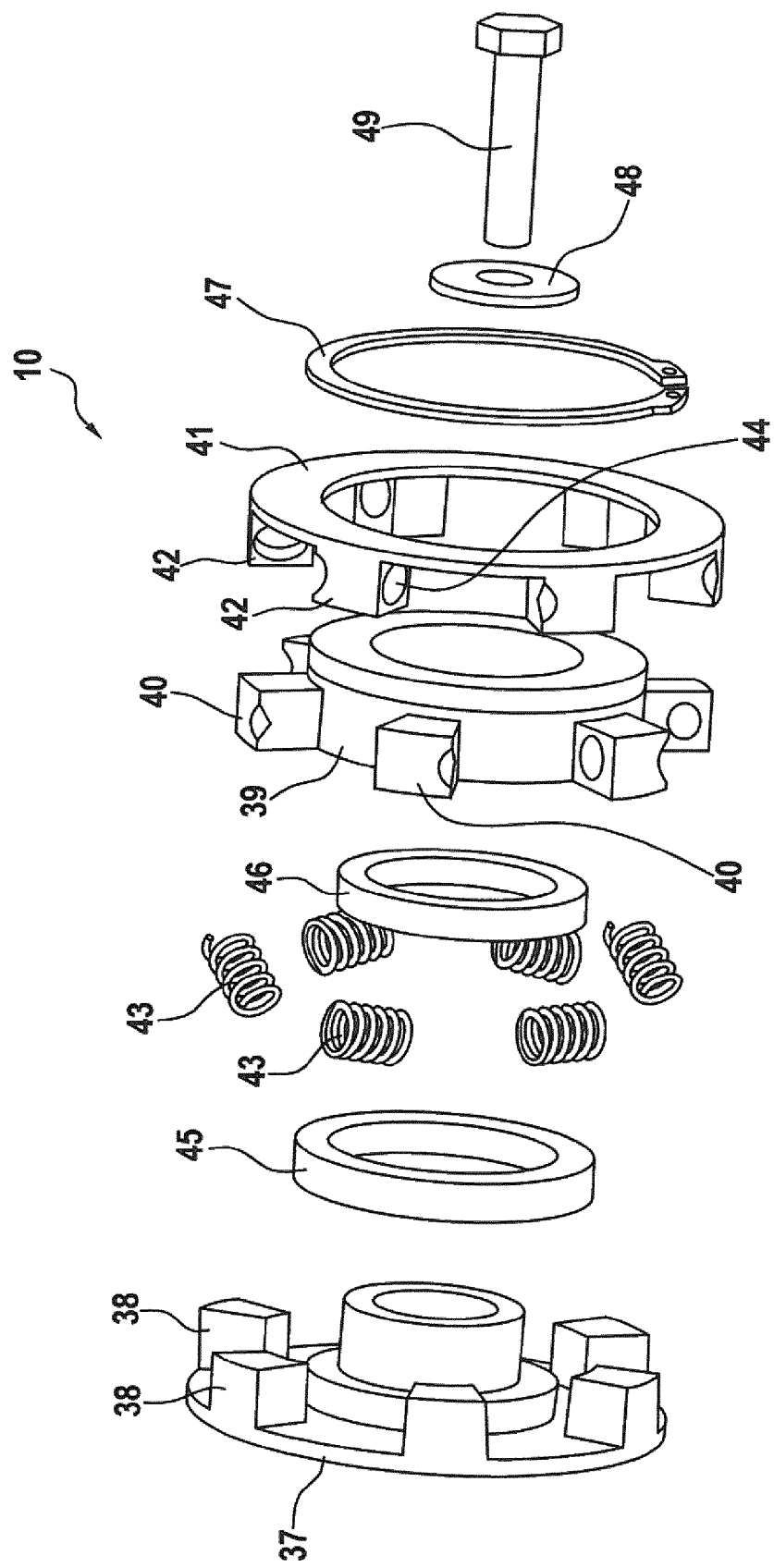
FIG. 13 is an exploded illustration of the coupling of the coupling arrangement according to the invention as per the sixth exemplary embodiment.

FIG. 12 shows the mounted state of the coupling arrangement 1 as per a further exemplary embodiment. FIG. 13 shows an exploded illustration of the associated coupling 10.

The coupling 10 comprises a first ring 37, a second ring 39 and a compensation ring 41. The first ring 37 has an internal cone which engages on an external cone on the first shaft 3. Furthermore, a clamping screw 49 is screwed into the first shaft 3, which clamping screw fixes the first ring 37 on the first shaft 3 via a clamping disk 48.

The second ring 39 is mounted rotationally conjointly on the second shaft 7 by way of a conical clamping element 46 and a clamping sleeve 45. A securing ring 47 secures the axial position of the compensation ring 41 relative to the second ring 39.

The first ring 37 has first claws 38. The second ring 39 has second claws 40. The first and second claws 38, 40 extend preferably in an axial direction. The compensation ring 41 has compensation claws 42. The compensation claws extend preferably in a radial direction 19.

The first claws 38, second claws 40 and compensation claws 42 engage with one another. As viewed in the circumferential direction 18, in each case one compensation claw 42 is situated between a first claw 38 and a second claw 40.

On the compensation claws 42 there are formed pockets 44 which open in the circumferential direction 18. In said pockets 44 there is seated in each case one spring 43, in particular helical compression spring. The respective spring 43 is supported by way of one end in the pocket 44 and by way of the other end against a second claw 40. The spring 43 pushes the respective compensation claw 42 away from the second claw 40. As a result, the compensation claw 42 presses against one of the first claws 38, whereby, in turn, said first claw 38 is pressed against the following second claw 40. This permits play-free abutment of the first claw 38 against the second claw 40, and thus also a play-free transmission of torque.

In summary, the invention relates to a coupling arrangement 1, comprising a first shaft 3, preferably a crankshaft of an internal combustion engine 2, a second shaft 7, preferably an armature shaft of an electric machine 6, which is arranged coaxially with respect to the first shaft 3, and a coupling 10 for connecting the first shaft 3 to the second shaft 7 without play, wherein an axis of rotation 17 is defined in accordance with the two coaxial shafts 3, 7, a circumferential direction 18 is defined about the axis of rotation 17, and a radial direction 19 is defined perpendicular to the axis of rotation 17, wherein the coupling 10 comprises at least one motion element 14, 31, 32, 43 and at least one coupling element 11, 29, 41 which is movable relative to the two shafts 3, 7 in the circumferential direction 18 and/or in the radial direction 19, and wherein the motion element 14, 31, 32, 43 is designed to press the coupling element 11, 29, 41 against the first and/or second shaft 3, 7 without play in the circumferential direction 18 and/or radial direction 19 in order to compensate for play in the circumferential direction 18 between the two shafts 3, 7 and for inevitable manufacturing-induced tolerances with regard to axial offset and angular offset of the two shafts 3 and 7. It is likewise made possible to realize, during operation, axial compensation necessitated for example by thermal expansion.

LIST OF REFERENCE NUMERALS

1 Coupling arrangement
2 Internal combustion engine
3 First shaft (crankshaft)
4 Engine case
5 Bearing
6 Electric machine
7 Second shaft (armature shaft)
8 Generator case
9 Screw connection
10 Coupling
11 First toothed shaft
12 Second toothed shaft
13 Third toothed shaft
14 Torsion spring
15 Rotation prevention means
16 Lugs
17 Axis of rotation
18 Circumferential direction
19 Radial direction
20 Polygonal formation
21 Pins
22 Mounting pin
23 Mounting plate
24 Main body
25 First groove
26 Second groove
27 First projection
28 Second projection
29 Piston
30 Studs
31 Hydraulic pressure chambers
32 Springs
33 Hydraulic ducts
34 Check valve
35 Outlet openings
36 Closure balls
37 First ring
38 First claws
39 Second ring
40 Second claws
41 Compensation ring
42 Compensation claws
43 Springs
44 Pockets
45 Clamping sleeve
46 Conical clamping element
47 Securing ring
48 Clamping disk
49 Clamping screw The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coupling arrangement comprising
  a first shaft configured as a crankshaft of an internal combustion engine;
  a second shaft configured as an armature shaft of an electric machine, wherein the second shaft is arranged coaxially with respect to the first shaft; and
  a coupling configured to connect the first shaft to the second shaft without play,
  wherein an axis of rotation is defined in accordance with the coaxially-arranged first shaft and second shaft, a circumferential direction is defined about the axis of rotation, and a radial direction is defined perpendicular to the axis of rotation,
  wherein said coupling comprises: at least one motion element and at least one coupling element which is movable relative to the first shaft and second shaft in at least one of the circumferential direction and the radial direction, and at least one sleeve having an engaged state that prevents such movement, and a disengaged state that permits such movement, and
  wherein the motion element is configured to compensate for play in the circumferential direction between the first shaft and second shaft by pressing the coupling element against at least one of the first shaft and second shaft without play in at least one of the circumferential direction and radial direction.

2. The coupling arrangement as claimed in claim 1, wherein the motion element is at least one of a spring and a hydraulic pressure chamber.

3. The coupling arrangement as claimed in claim 1, wherein the coupling is configured as an Oldham coupling and comprises a rotating main body,
  wherein the first shaft and second shaft each have a groove, and the main body engages by way of projections into the grooves,
  wherein at least one coupling element is formed by a piston which is mounted in the main body so as to be movable in a radial direction.

4. The coupling arrangement as claimed in claim 3, wherein the motion element is at least one of a spring and a hydraulic pressure chamber, wherein the motion element forces the piston away from the main body, such that the piston abuts against the first shaft or second shaft.

5. The coupling arrangement as claimed in claim 4, wherein a plurality of pistons that are movable in a radial direction are arranged on a side of the main body that faces toward the first shaft and on a side of the main body that faces toward the second shaft.

6. The coupling arrangement as claimed in claim 3, wherein a plurality of pistons that are movable in a radial direction are arranged on a side of the main body that faces toward the first shaft and on a side of the main body that faces toward the second shaft.

7. The coupling arrangement as claimed in claim 1, wherein the coupling is a claw coupling comprising:
  a first ring arranged rotationally conjointly on the first shaft and which has first claws;
  a second ring arranged rotationally conjointly on the second shaft and which has second claws; and
  a compensation ring which is arranged between the first and second shafts and which has compensation claws,
  wherein the first claws, the second claws and the compensation claws engage with one another and, as viewed in the circumferential direction, in each case one compensation claw is arranged between a first claw and a second claw, and wherein, between at least one second claw and one compensation claw, there is arranged a spring for pressing the second claws against the first claws.

8. The coupling arrangement as claimed in claim 1, wherein the coupling comprises, as coupling elements, a first toothed shaft, a second toothed shaft and a third toothed shaft arranged between the first toothed shaft and the second toothed shaft, wherein the three toothed shafts are arranged coaxially with respect to the axis of rotation, wherein the first toothed shaft is connected to the second toothed shaft by way of a torsion spring.

9. The coupling arrangement as claimed in claim 8, wherein the first shaft comprises a first shaft toothing, and
the second shaft comprises a second shaft toothing,
wherein the first shaft toothing meshes with the first toothed shaft and simultaneously with the third toothed shaft, and
wherein the second shaft toothing meshes with the second toothed shaft and simultaneously with the third toothed shaft.

10. The coupling arrangement as claimed in claim 9, wherein the first toothed shaft and the second toothed shaft are each connected rotationally conjointly to the torsion spring, and the third toothed shaft is arranged so as to be rotatable relative to the torsion spring.

11. The coupling arrangement as claimed in claim 8, wherein the first toothed shaft and the second toothed shaft are each connected rotationally conjointly to the torsion spring, and the third toothed shaft is arranged so as to be rotatable relative to the torsion spring.

12. The coupling arrangement as claimed in claim 8, wherein the third toothed shaft is internally hollow, and the torsion spring extends through the third toothed shaft.

13. A method for mounting a coupling arrangement as claimed in claim 8, the method comprising the acts of:

bracing the torsion spring by rotating the first toothed shaft relative to the second toothed shaft;
inserting a first rotation prevention means that fixes the first toothed shaft relative to the third toothed shaft;
inserting a second rotation prevention means that fixes the second toothed shaft relative to the third toothed shaft;
mounting the first toothed shaft on the first shaft;
mounting the second toothed shaft on the second shaft; and
releasing the two rotation prevention means.

14. The method as claimed in claim 13, wherein the first rotation prevention means comprises a first sleeve that is pushed on and, for fixing purposes, meshes simultaneously with the toothings of the first toothed shaft and of the third toothed shaft.

15. The method as claimed in claim 14, wherein the second rotation prevention means comprises a second sleeve that is pushed on and, for fixing purposes, meshes simultaneously with the toothings of the second toothed shaft and of the third toothed shaft.

16. The method as claimed in claim 15, wherein, during the mounting of the second toothed shaft on the second shaft, the second sleeve is pushed fully onto the third toothed shaft.

17. The method as claimed in claim 14, wherein, during the mounting of the first toothed shaft on the first shaft, the first sleeve is pushed fully onto the third toothed shaft.

18. The method as claimed in claim 13, wherein, the first rotation prevention means comprises at least one first pin that is pushed in and, for fixing purposes, engages simultaneously into the first toothed shaft and into the third toothed shaft.

19. The method as claimed in claim 18, wherein, during the mounting of the first toothed shaft on the first shaft, the at least one first pin is pushed fully into the third toothed shaft.

20. The method as claimed in claim 13, wherein, the second rotation prevention means comprises at least one second pin that is pushed in and, for fixing purposes, engages simultaneously into the second toothed shaft and into the third toothed shaft.

21. The method as claimed in claim 20, wherein, during the mounting of the second toothed shaft on the second shaft, the at least one second pin is pushed fully into the third toothed shaft.

* * * * *